United States Patent Office.

JOHN MABREY, OF JEFFERSON CITY, MISSOURI.

Letters Patent No. 79,241, dated June 23, 1868.

IMPROVED FEVER-AND-AGUE MEDICINE.

The Schedule referred to in these Letters Patent and making part of the same.

TO ALL WHOM IT MAY CONCERN:

Be it known that I, JOHN MABREY, of Jefferson City, in the county of Cole, and State of Missouri, have invented a new and valuable Remedy for Fever and Ague and other Bilious Diseases; and I do hereby declare that the following is a full, clear, and exact description of the ingredients of which the same is compounded, and the method of compounding the same.

The object of my invention is to provide a better remedy than has heretofore been known or used for the cure of fever and ague and other bilious diseases.

To this end I take one ounce of purified chinoidine and one pint of pure cider vinegar, and mix them thoroughly together. I then add one pint of Orleans molasses, and mix the compound thoroughly. I then take one-half ounce of pure lemon-oil and one-half ounce of pure oil of peppermint, and add them to the compound. I then shake or otherwise mix the entire compound thoroughly, and the medicine is ready for use.

What I claim as my invention, and desire to secure by Letters Patent, is—

A remedy for the fever and ague and other bilious diseases, compounded of the ingredients, in the proportions, and in the manner herein specified, substantially as described.

JOHN MABREY.

Witnesses:
   A. FULKERSON,
   A. SMITH.